US007849459B2

(12) United States Patent
Burkhart et al.

(10) Patent No.: US 7,849,459 B2
(45) Date of Patent: Dec. 7, 2010

(54) DEPLOYING JAVA APPLICATIONS IN RESOURCE CONSTRAINED ENVIRONMENTS

(75) Inventors: Michael John Burkhart, Round Rock, TX (US); David Klein, Georgetown, TX (US); Brian Thomas Lillie, Cedar Park, TX (US); Daniel Mark Schumacher, Pflugerville, TX (US); Thomas J. Watson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 10/981,255

(22) Filed: Nov. 4, 2004

(65) Prior Publication Data

US 2006/0101453 A1 May 11, 2006

(51) Int. Cl.
*G06F 9/445* (2006.01)
*G06F 9/44* (2006.01)

(52) U.S. Cl. .................. 717/174; 717/168; 717/120; 717/108; 717/116

(58) Field of Classification Search .................. 717/174
See application file for complete search history.

(56) References Cited

U.S. PATENT DOCUMENTS

| | | | | |
|---|---|---|---|---|
| 6,530,080 | B2 * | 3/2003 | Fresko et al. | 717/166 |
| 6,584,612 | B1 * | 6/2003 | Mueller et al. | 717/166 |
| 6,658,625 | B1 * | 12/2003 | Allen | 715/236 |
| 6,675,382 | B1 * | 1/2004 | Foster | 717/177 |
| 6,732,108 | B2 * | 5/2004 | Factor et al. | 707/100 |
| 6,751,797 | B1 * | 6/2004 | Desgranges et al. | 719/315 |
| 6,948,151 | B2 * | 9/2005 | Gerken | 717/108 |
| 6,961,929 | B1 * | 11/2005 | Pelegri-Llopart et al. | 717/136 |
| 7,000,218 | B2 * | 2/2006 | Gerken | 717/106 |
| 7,127,713 | B2 * | 10/2006 | Davis et al. | 717/177 |
| 7,159,224 | B2 * | 1/2007 | Sharma et al. | 719/310 |
| 7,162,687 | B2 * | 1/2007 | Pelegri-Llopart et al. | 715/234 |
| 7,165,243 | B1 * | 1/2007 | Pelegri-Llopart et al. | 717/136 |
| 7,246,134 | B1 * | 7/2007 | Kitain et al. | 707/102 |
| 7,246,351 | B2 * | 7/2007 | Bloch et al. | 717/175 |
| 7,305,671 | B2 * | 12/2007 | Davidov et al. | 717/172 |
| 7,512,932 | B2 * | 3/2009 | Davidov et al. | 717/106 |

(Continued)

OTHER PUBLICATIONS

Martin LaMonica, "BEA ships key software upgrade", Jul. 17, 2003, retrieved from <http://news.cnet.com>, pp. 1-2.*

(Continued)

*Primary Examiner*—Tuan Q Dam
*Assistant Examiner*—Marina Lee
(74) *Attorney, Agent, or Firm*—Brandon C. Kennedy; Justin Dillon; Biggers & Ohanian, LLP (57) ABSTRACT

Methods, systems, and products are provided for deploying Java applications in resource constrained environments. Embodiments include identifying a resource constraint of a target system and filtering the Java application in dependence upon the identified resource constraint. In many embodiments, identifying a resource constraint of a target system includes identifying limited runtime processing capabilities of the target system and filtering the Java application in dependence upon the identified resource constraint includes preprocessing a tag library of the Java application. In some embodiments, preprocessing a tag library is carried out by identifying a tag library descriptor of the Java application and copying a listener from the tag library descriptor to a deployment descriptor for the Java application.

12 Claims, 7 Drawing Sheets

U.S. PATENT DOCUMENTS

| | | | |
|---|---|---|---|
| 7,546,576 B2* | 6/2009 | Egli | 717/106 |
| 7,565,647 B2* | 7/2009 | Davidov et al. | 717/140 |
| 7,580,703 B1* | 8/2009 | Veselov et al. | 455/414.1 |
| 2002/0073236 A1* | 6/2002 | Helgeson et al. | 709/246 |
| 2003/0005411 A1* | 1/2003 | Gerken | 717/120 |
| 2003/0009743 A1* | 1/2003 | Fresko et al. | 717/117 |
| 2003/0020752 A1* | 1/2003 | Santiago | 345/764 |
| 2003/0084097 A1* | 5/2003 | Messinger et al. | 709/203 |
| 2003/0093465 A1* | 5/2003 | Banerjee et al. | 709/203 |
| 2003/0093717 A1* | 5/2003 | Mason | 714/38 |
| 2003/0225774 A1* | 12/2003 | Davidov et al. | 707/100 |
| 2003/0226136 A1* | 12/2003 | Calahan | 717/162 |
| 2004/0093595 A1* | 5/2004 | Bilange | 717/171 |
| 2004/0095386 A1* | 5/2004 | Flynn et al. | 345/762 |
| 2004/0103407 A1* | 5/2004 | Blaukopf et al. | 717/140 |
| 2004/0158571 A1* | 8/2004 | Kovacs et al. | 707/100 |
| 2004/0158577 A1* | 8/2004 | Chu et al. | 707/103 R |
| 2004/0177352 A1* | 9/2004 | Narayanaswamy et al. | 717/169 |
| 2004/0255293 A1* | 12/2004 | Spotswood | 717/176 |
| 2004/0255294 A1* | 12/2004 | Spotwood | 717/176 |
| 2004/0268312 A1* | 12/2004 | Abe et al. | 717/124 |
| 2005/0003810 A1* | 1/2005 | Chu et al. | 455/418 |
| 2005/0235248 A1* | 10/2005 | Victoria et al. | 717/102 |
| 2005/0278718 A1* | 12/2005 | Griffith et al. | 717/175 |
| 2006/0053410 A1* | 3/2006 | Charisius et al. | 717/109 |
| 2006/0101453 A1* | 5/2006 | Burkhart et al. | 717/168 |
| 2007/0143748 A1* | 6/2007 | Hennessy | 717/171 |
| 2008/0201701 A1* | 8/2008 | Hofhansl et al. | 717/168 |

OTHER PUBLICATIONS

"RSA Security Announces Support for BEA WebLogic Platform 8.1" Aug. 6, 2003, retrieved from <http://www.rsa.com/press_release.aspx?id=2662>, pp. 1-3.*

"BEA WebLogic Platform Release Notes", Jun. 2004, retrieved from <http://ftp.ren.nic.in/pub/Windows/Java/Servers/WebLogic%20Platform%208.1/Documentations/releasenotes.pdf>, pp. 1-60.*

Ananthamurthy et al., "Migrating from Tomcat to WebLogic Express", Jan. 23, 2004, Oracle Technology Network, pp. 1-21.*

Goodwill, "Deploying Web Applications to Tomcat", Apr. 19, 2001, retrieved from <http://oreilly.com/lpt/a/780> Total pp. 12.*

Mason et al., "Custom JSP tags speed Web development", Sep. 19, 2002, retrieved from <http://search400.techtarget.com/tip/0,289483,sid3_gci851454,00.html>Total pp. 8.*

Mahmoud, Deploying Wireless Java Applications>, Oct. 2002, retrieved from <http://developers.sun.com/mobility/midp/articles/deploy/> Total pp. 8.*

Gary M. Katz, APR, Jeode Platform Improves Java Functionality>, Nov. 14, 2000, 12:00:00 AM EST., retrieved from <http://www.embedded.com/192200699?printable=true> Total pp. 4.*

Michael Juntao Yuan, "Jeode Platform Improves Java Functionality", Apr. 16, 2004, retrieved from <http://www.informit.com/articles/printerfriendly.aspx?p=170448> Total pp. 22.*

* cited by examiner

DEPLOYING JAVA APPLICATIONS IN RESOURCE CONSTRAINED ENVIRONMENTS

BACKGROUND OF THE INVENTION

1. Field of the Invention

The field of the invention is data processing, or, more specifically, methods, systems, and products for deploying Java applications in resource constrained environments. 'Java' is a registered trademark of Sun Microsystems, Inc.

2. Description Of Related Art

The use of Java applications generally and Web applications more specifically, is increasing rapidly. Many companies are training application developers in J2EE ("Java 2 Platform, Enterprise Edition") design patterns and are using the J2EE programming model. While the use of Java applications is growing, the number of embedded devices having resource constraints making deploying Java applications difficult also continues to grow. Such embedded devices often have limited memory, low performance processors, and limited persistent storage. There is increasing demand for business applications for such resource constrained embedded devices that are similar to those developed for systems with more robust resources. Some technologies designed to facilitate deploying Java applications on embedded technologies are currently available. Wireless Binary XML ('WBXML'), for example, currently provides a means of compressing the XML into a smaller format thereby reducing some system requirements of embedded devices. WBXML however requires a 'rehydration' of the compressed XML and requires the rehydrated binary XML to be parsed. This does not remove the need for XML parsing altogether and therefore has only limited benefits for embedded devices. There is therefore an ongoing need for methods, systems, and products for deploying Java applications in resource constrained environments to allow businesses to leverage their investments in enterprise Java program developers, and leverage aspects of current business applications by using them in embedded environments.

SUMMARY OF THE INVENTION

Methods, systems, and products are provided for deploying Java applications in resource constrained environments. Embodiments include identifying a resource constraint of a target system and filtering the Java application in dependence upon the identified resource constraint. In many embodiments, identifying a resource constraint of a target system includes identifying limited runtime processing capabilities of the target system and filtering the Java application in dependence upon the identified resource constraint includes preprocessing a tag library of the Java application. In some embodiments, preprocessing a tag library is carried out by identifying a tag library descriptor of the Java application and copying a listener from the tag library descriptor to a deployment descriptor for the Java application. Many embodiments also include identifying to Java runtime platform the copying of the listener from the tag library descriptor to the deployment descriptor.

In many embodiments, identifying a resource constraint of a target system includes identifying that the target system has no XML parser and filtering the Java application in dependence upon the identified resource constraint includes replacing a static XML deployment descriptor with a deployment descriptor readable without an XML parser. Some embodiments also include identifying to a Java runtime platform the replacing of a static XML deployment descriptor with a deployment descriptor readable without an XML parser.

In many embodiments, identifying a resource constraint of a target system includes identifying a target system having limited processing capacity and filtering the Java application in dependence upon the identified resource constraint includes identifying a hierarchy of classes of the Java application stored in a single file and storing each class of the hierarchy as a separate file accessible to the Java application. Many of these embodiments also include decompressing the single file containing the hierarchy of classes.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for deploying Java applications in resource constrained environments. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Deploying Java Applications in Resource Constrained Environments

Figure 1:
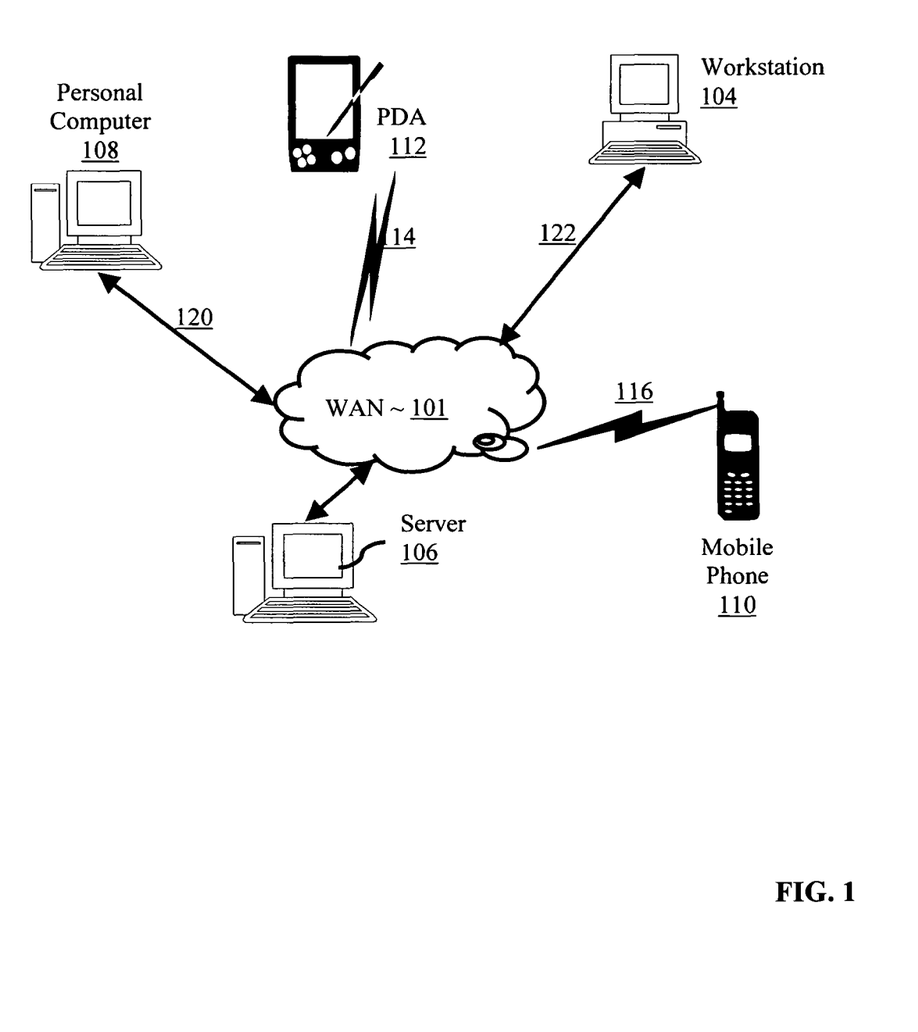
FIG. 1 depicts an exemplary data processing system useful in implementing Java applications.

Exemplary methods, systems, and products for deploying Java applications in resource constrained environments are now explained with reference to the accompanying drawings, beginning with FIG. 1. FIG. 1 depicts an exemplary data processing system useful in implementing Java applications. In this specification, a Java application means any application created in the Java programming language. One particular kind of Java application particularly suited for embodiments of the present invention is a Web application. In this specification the term a "Web application" means a hierarchy of directories and files in a standard layout that operate as a dynamic extension of a Web application server. Such a hierarchy of directories and files can typically be accessed in an "unpacked" form, where each directory and file exists in the file system separately, or in a "packed" form known as a Web ARchive, or "WAR" file. The former format is more useful during development, while the latter is often used for deployment of the Web application onto the target system on which the Web application is to be installed.

The top-level directory of a Web application is also the document root of the Web application. In this top-level directory, a developer places the HTML files ("HyperText Markup Language") and JSP pages ("Java Server Pages") that comprise the Web application's user interface. When a system administrator deploys the Web application onto a particular server, the system administrator assigns a context path to the Web application Two exemplary types of Web applications are presentation-oriented Web applications and service-oriented Web application. A presentation-oriented Web application generates dynamic Web pages containing various types of markup language (HTML, XML, and so on) in response to requests. A service-oriented Web application implements the endpoint of a Web service. Service-oriented Web applications are often invoked by presentation-oriented applications.

In the Java 2 Platform, Web components provide the dynamic extension capabilities for a Web application server. Examples of such Web components include Java Servlets or JSP pages. Servlets are Java programming language classes that dynamically process requests and construct responses. JSP pages are text-based documents that execute as servlets and allow the creation of static content. Although servlets and JSP pages can be used interchangeably, each has its own strengths. Servlets are often optimized for service-oriented Web applications and managing the control functions of presentation-oriented applications, such as dispatching requests and handling non-textual data. JSP pages are optimized for generating text-based markup such as HTML, SVG, WML, and XML.

Web applications run on a Java runtime platform called a Web container. A Web container provides services for such as request dispatching, security, concurrency, and life cycle management for Web applications. Web containers also give Web components access to APIs for naming, transactions, and e-mail. One exemplary Web container useful in embodiments of the presenting invention is 'Tomcat.' Tomcat is a Web container that is identified in the official Reference Implementation for the Java Servlet and JavaServer Pages specifications. Tomcat is developed by Apache and released under the Apache Software License and is intended to be a collaboration of the best-of-breed developers from around the world.

While many embodiments of the present invention are described with specific reference to Web applications, this is for explanation and not for limitation. In fact, methods, systems, and products for deploying Java applications according to the present invention may be applied to more than Web applications and may be applied to Java applications generally as will occur to those of skill in the art.

The system of FIG. 1 includes a number of computers connected for data communications in networks. Each of the computers of the system of FIG. 1 may have deployed upon it a Java application according to embodiments of the present invention. The system of FIG. 1 includes wide area network ("WAN") (101). The network connection aspect of the architecture of FIG. 1 is only for explanation, not for limitation. In fact, systems for deploying Java applications in resource constrained environments may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

The system of FIG. 1 includes a Web server (106) upon which a Java applications such as, for example, a Web application may be deployed in accordance the present invention. The system of FIG. 1 also includes a personal computer (108) and workstation (104) upon which a Java application may be deployed in accordance with the present invention. Typical personal computers and workstations often have fewer resources than conventional Web servers. The system also includes further resource constrained environments upon which a Java application may be deployed according to aspects of the present invention that include a PDA (112) and a network-enabled mobile phone (110). In the example of FIG. 1, the network-enabled mobile phone (110) connects to WAN (101) through wireless link (116), and the PDA (112) connects to network (101) through a wireless link (114). In the example of FIG. 1, the personal computer (108) connects through a wireline connection (120) to the WAN (101), and the computer workstation (104) connects through a wireline connection (122) to the WAN (101).

The arrangement of computers making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Deploying Java applications on resource constrained target systems such as those illustrated in FIG. 1 according to embodiments of the present invention is carried out by identifying a resource constraint of a target system (108, 112, 104, 110) and filtering a Java application in dependence upon the identified resource constraint. Examples of target systems with resource constraints include target systems with limited runtime processing capabilities, target systems having no XML parser, target systems having limited persistent storage, and so on as will occur to those of skill in the art.

As mentioned above, deploying Java applications in resource constrained environments is generally implemented with computers, that is, with automated computing machinery. For further explanation, FIG. 2 sets forth a block diagram of automated computing machinery comprising a computer (134) capable of supporting a Java application generally, and a Web application more particularly, according to embodiments of the present invention. The computer (134) of FIG. 2 includes at least one computer processor (156) or 'CPU' as well as random access memory (168) ("RAM"). Stored in RAM (168) is an operating system (154). Operating systems useful in computers according to embodiments of the present invention include Unix, and Linux, and many others as will occur to those of skill in the art. Operating system (154) in the example of FIG. 2 is shown in RAM (168), but many components of an operating system typically are stored in non-volatile memory (166) also.

Also stored in RAM is a WM ("Java Virtual Machine") (190). A JVM is a platform-independent execution environment that converts Java bytecode into machine language and executes it. Most programming languages compile source code directly into machine code that is designed to run on a specific microprocessor architecture or operating system, such as Windows or UNIX. A JVM mimics a real Java processor, enabling Java bytecode to be executed as actions or operating system calls on any processor regardless of the operating system.

Figure 2:
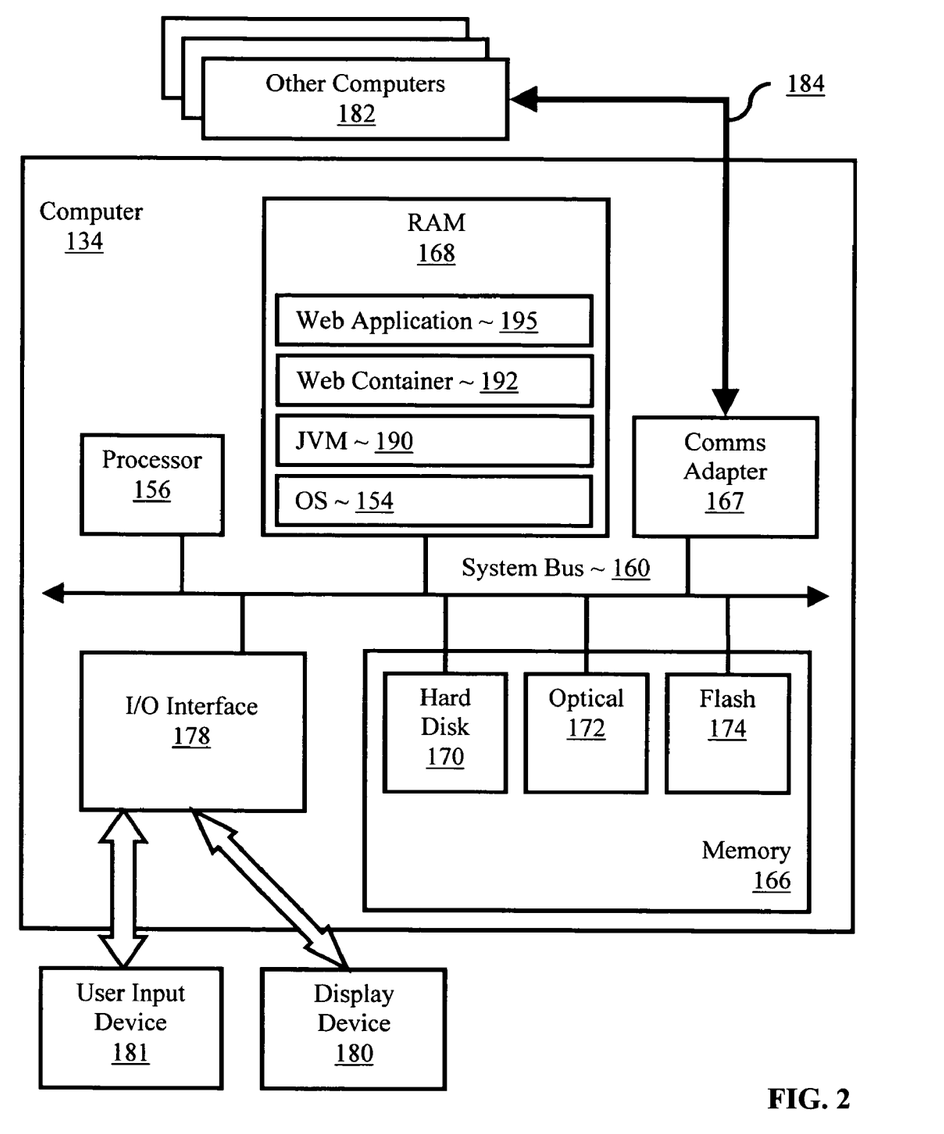
FIG. 2 sets forth a block diagram of automated computing machinery comprising a computer useful in deploying Java applications according to embodiments of the present invention.

Also stored in RAM in the example of FIG. 2 is a Web container (192) and a Web application (194). As discussed above, Web container provides services for such as request dispatching, security, concurrency, and life cycle management for Web applications (194). Web containers also give Web components access to APIs for naming, transactions, and e-mail. One exemplary Web container useful in embodiments of the presenting invention is 'Tomcat.' As discussed above, one particular kind of Java application particularly applicable to embodiments of the present invention are Web applications. The exemplary Web application (194) of FIG. 1 is a hierarchy of directories and files in a standard layout that operate as a dynamic extension of the Web container.

The computer (134) of FIG. 2 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary computer (134) of FIG. 2 includes a communications adapter (167) for implementing connections for data communications (184), including connections through networks, to other computers (182), including servers, clients, and others as will occur to those of skill in the art. Communications adapters implement the hardware level of connections for data communications through which local devices and remote devices or servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 3:
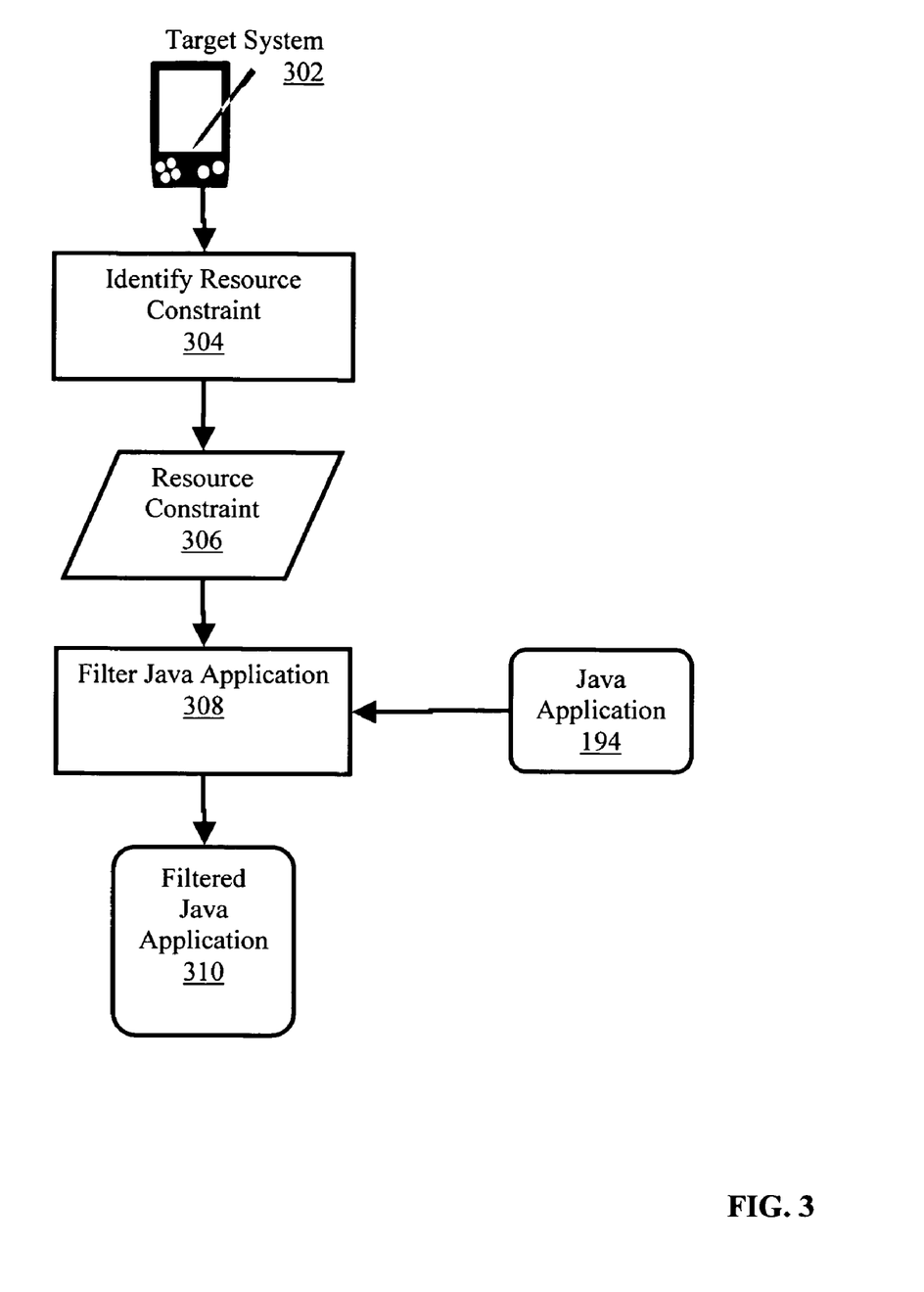
FIG. 3 sets forth a flow chart illustrating an exemplary method for deploying Java applications in resource constrained environments.

For further explanation FIG. 3 sets forth a flow chart illustrating an exemplary method for deploying Java applications in resource constrained environments. The method of FIG. 3 includes identifying (304) a resource constraint (306) of a target system (302). A target system (302) may be any computer having a resource constraint such as for example, embedded devices such as PDAs, mobile phones, special purpose devices, as well as other computers such as laptops, workstations, personal computers, servers, or any other such computer that will occur to those of skill in the art.

The method of FIG. 3 also includes filtering (308) the Java application in dependence upon the identified resource constraint. In the example of FIG. 3, filtering the Java application according to embodiments of the present invention typically includes modifying the Java application to accommodate the identified resource constraint of the target system. In the method of FIG. 3, identifying (304) a resource constraint (306) of a target system (302) and filtering (308) the Java application in dependence upon the identified resource constraint is carried out by a Java application developer using an optimization tool. For example, in the case of deploying Web applications identifying (304) a resource constraint (306) of a target system (302) and filtering (308) the Java application in dependence upon the identified resource constraint may be carried out by use of a WAB tool. A WAB tool or "Web Application Builder" is a program that facilitates building Web applications without requiring extensive programming on the part of the developer. WAB tools typically allow developers to add, search, edit and delete data in Web applications. Filtering (308) the Java application in dependence upon the identified resource constraint advantageously optimizes the Java application for the resource constrained target system.

Figure 4:
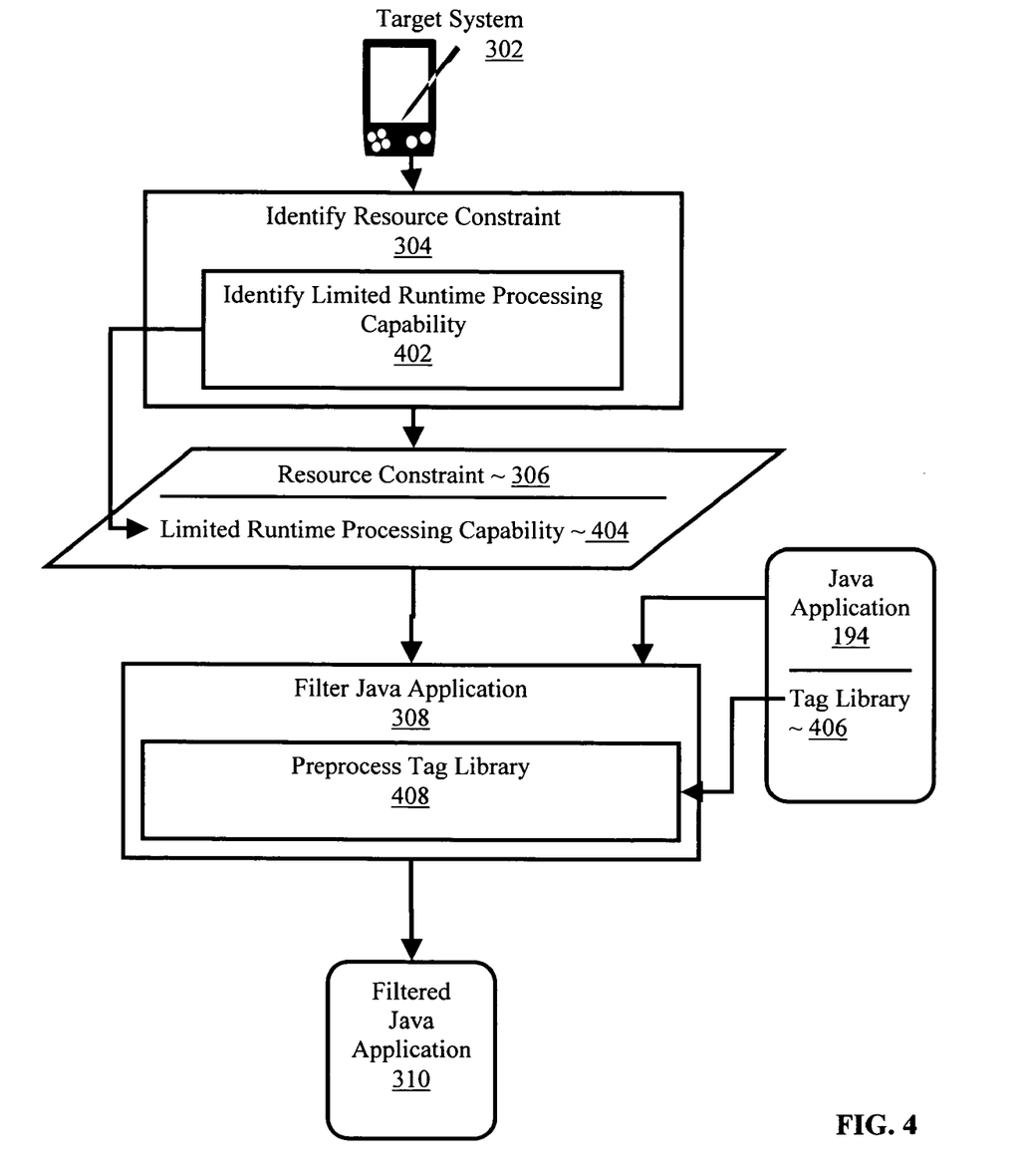
FIG. 4 sets forth a flow chart illustrating deploying Java applications on a target system having limited runtime processing capabilities.

As discussed above, examples of target systems with resource constraints include target systems with limited runtime processing capabilities, target systems having no XML parser, target systems having limited persistent storage, and so on as will occur to those of skill in the art. For further explanation, FIG. 4 sets forth a flow chart illustrating deploying Java applications on a target system having limited runtime processing capabilities that is particularly useful in deploying Web applications. In the method of FIG. 4, identifying (304) a resource constraint (306) of a target system (302) is carried out by identifying (402) limited runtime processing capabilities (404) of the target system (302). Identifying (402) limited runtime processing capabilities (404) of the target system (302) is typically carried out by a Java application developer seeking to optimize a Java application, such as for example a Web application, for a particular target system or for target systems sharing a particular resource constraint.

In the method of FIG. 4, filtering (308) the Java application (194) in dependence upon the identified resource constraint (404) is carried out by preprocessing (408) a tag library (406) of the Java application (194). Tag libraries define declarative, modular functionality of tags that can be reused by any JSP page. Tag libraries reduce the necessity to embed large amounts of Java code in JSP pages by moving the functionality of tags into tag implementation classes stored in the tag libraries. The term tag library includes standard tag libraries such as for example the JavaServer Pages Standard Tag Library (JSTL), custom tag libraries developed for the Java application itself, as well as others as will occur to those of skill in the art.

The tag libraries contain tag library descriptors that describe the tag library. A tag library descriptor (TLD) is an XML document that describes a tag library. A TLD contains information about a library as a whole and about each tag contained in the library. TLD file names have the extension .tld. In the case of Web applications, TLD files are also typically stored in the WEB-INF directory of the Web application's WAR file or in a subdirectory of WEB-INF. TLDs typically include only limited information that is actually processed by a Web container at runtime. Most of the data contained in the TLD files specify information needed by a Web container to use the tag library for already compiled JSP servlets. That is, the information contained in TLDs is extracted by a Web application builder at tool time and provided to the Web container in the deployment descriptor at runtime. Preprocessing the tag library therefore reduces the runtime processing requirements of a target system and therefore optimizes the Java application for target systems having limited runtime processing capabilities.

Figure 5:
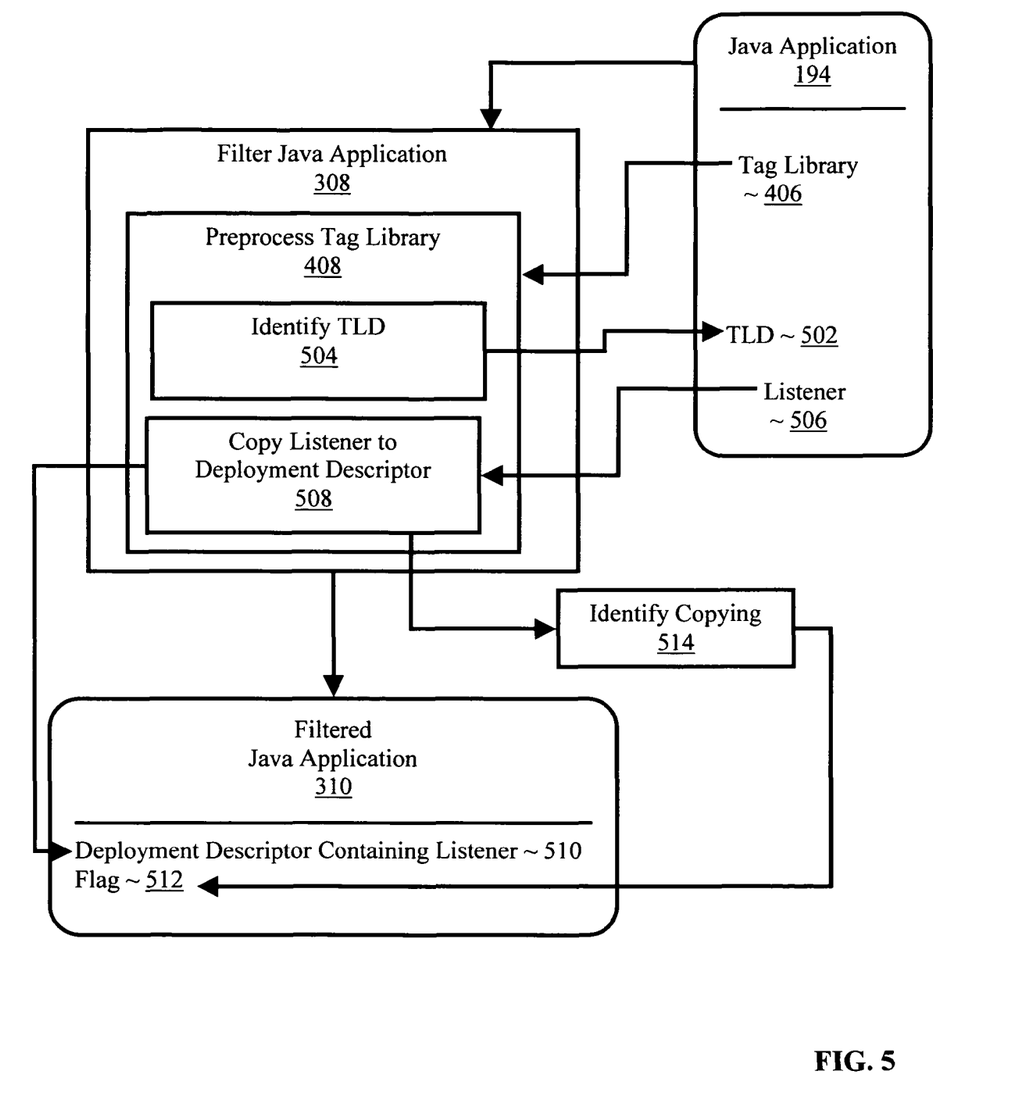
FIG. 5 sets forth an exemplary method of preprocessing a tag library.

For further explanation, FIG. 5 sets forth an exemplary method of preprocessing (408) a tag library (406) that includes identifying (504) a tag library descriptor (502) of the Java application (194). As discussed above, a tag library descriptor (TLD) is an XML document that describes a tag library. A TLD contains information about a library as a whole and about each tag contained in the library.

The method of FIG. 5 also includes copying (508) a listener (506) from the tag library descriptor (502) to a deployment descriptor (510) for the Java application (310). A listener (506) is an event listener element instantiated by a Java runtime platform, such as Web container, that monitors and reacts to events in the execution of a servlet by defining listener objects whose methods get invoked by events in the execution of servlets. The events in the execution of a servelet are Servlet Life Cycle events such as those defined in the Java Servlet specification. These Life Cycle Events include events that can be monitored. When a listener method is invoked, it is passed an event that contains information appropriate to the event. For example, the methods in the HttpSessionListener interface are passed an HttpSessionEvent, which contains an HttpSession.

In the case of a Web application, a deployment descriptor is an XML file describing the servlets and other components that make up the Web application, along with any initialization parameters and Web container-managed security constraints that are to be enforced by the Web container. The deployment descriptor defines all the information needed by the Web container except a context path, which is assigned by the system administrator when the application is deployed. The Java Servlet Specification includes a Document Type Descriptor (DTD) for deployment descriptors, and Web containers such as Tomcat enforce the rules defined in the DTD when Web applications are processed.

Copying (508) a listener (506) from the tag library descriptor (502) to a deployment descriptor (510) for the Java application (310) reduces the runtime processing requirements of the target system. In the case of Web applications, for example, providing the listener at run time to the Web container in the deployment descriptor removes the requirement of a Web container to identify the appropriate TLD and to locate the listener contained in the TLD thereby reducing the overall runtime processing requirements of the target system.

To gain the efficiency provided by the method of FIG. 5, a Java runtime platform, such as a Web container, running the Java application should be informed of that event listeners have been copied from the tag library descriptor to the deployment descriptor for the Java application. The method of FIG. 5 therefore also includes identifying (514) to a Java runtime platform the copying of the listener from the tag library descriptor to the deployment descriptor (510). One way of identifying (514) to a Java runtime platform the copying of the listener from the tag library descriptor to the deployment descriptor (510) includes setting a flag (512) in the Java application (310). In some embodiments, such as in the case of Web applications, setting a flag (512) in the Java application (310) may be carried out by setting a flag in a properties file of the Web application WAR file.

Figure 6:
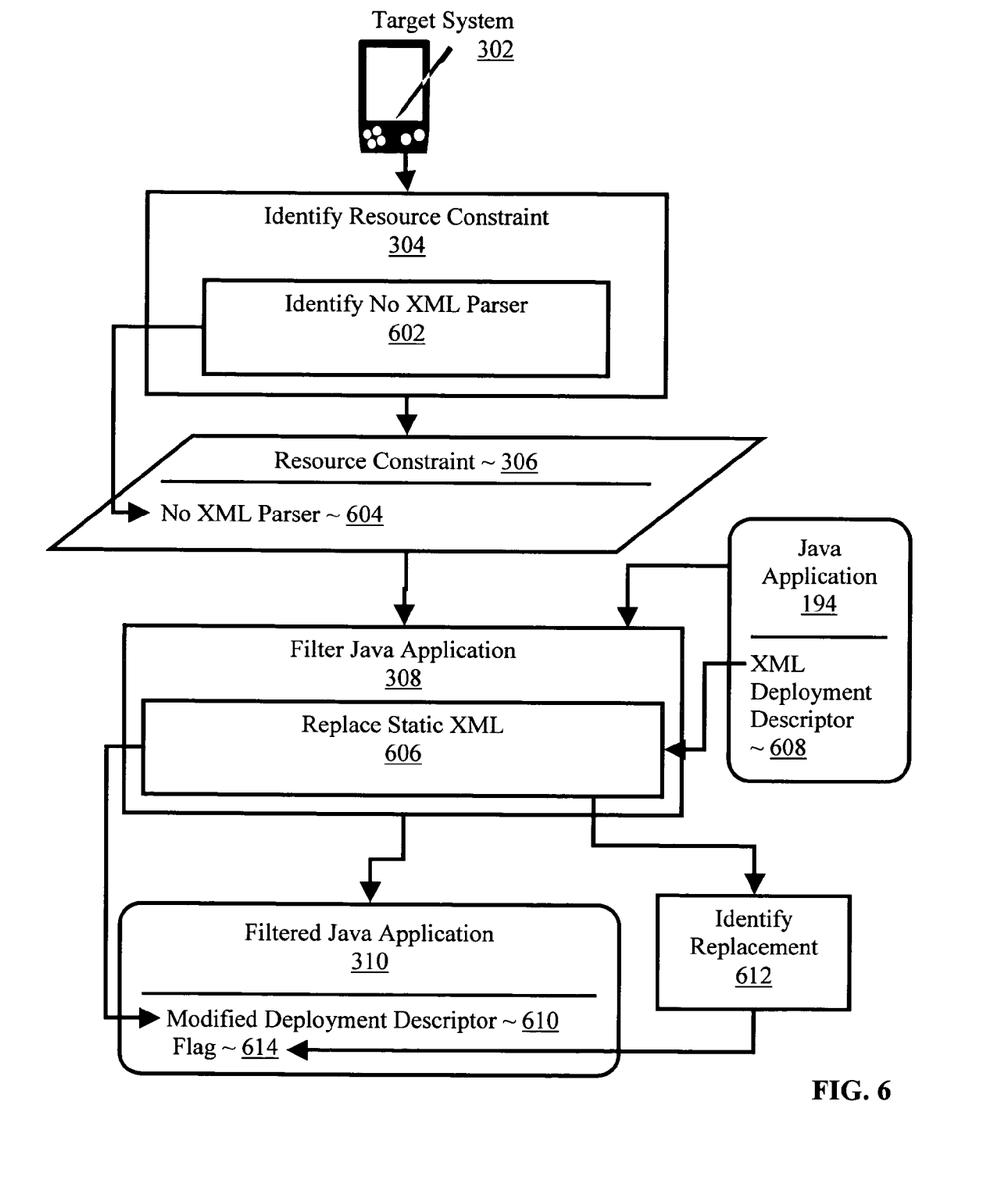
FIG. 6 sets forth a flow chart illustrating an exemplary method for deploying Java applications on target systems having no XML parser.

As discussed above, examples of target systems with resource constraints include target systems with limited runtime processing capabilities, target systems having no XML parser, target systems having limited persistent storage, and so on as will occur to those of skill in the art. For further explanation, FIG. 6 sets forth a flow chart illustrating an exemplary method for deploying Java applications on target systems having no XML parser. In the method of FIG. 6, identifying (304) a resource constraint (306) of a target system (302) is carried out by identifying (602) that the target system (302) has no XML parser (604). Identifying (602) that the target system (302) has no XML parser (604) is typically carried out by a Java application developer seeking to optimize a Java application for a particular target system having no XML parser or for target systems for whom the requirement to parse XML strains available resources.

In the method of FIG. 6, filtering (308) the Java application (194) in dependence upon the identified resource constraint (604) is carried out by replacing (606) a static XML deployment descriptor (608) with a deployment descriptor (610) readable without an XML parser. One way of replacing a static XML deployment descriptor with a deployment descriptor readable without an XML parser is carried out by replacing the static XML deployment descriptor with a plurality of name-value pairs stored in a properties file accessible to Java application.

Another way of replacing a static XML deployment descriptor with a deployment descriptor readable without an XML parser is carried out by replacing the static XML deployment descriptor with a serialized object. To serialize an object means to convert its state to a byte stream so that the byte stream can be reverted back into a copy of the object. A Java object is serializable if its class or any of its superclasses implements either the java.io.Serializable interface or its sub-interface, java.io.Externalizable. Deserialization is the process of converting the serialized form of an object back into a copy of the object. The Java platform specifies a default way by which serializable objects are serialized. When an object is serialized, information that identifies its class is recorded in the serialized stream.

The removal of XML parsing at runtime advantageously lowers the required footprint of the target system and decreases the processing requirements of the target system. To gain the efficiency provided by the method of FIG. 6 however, a Java runtime platform running the Java application, such as for example a Web container running a Web application, should be informed that a static XML deployment descriptor (608) has been replaced with a deployment descriptor (610) readable without an XML parser. The method of FIG. 6 therefore also includes identifying (612) to the Java runtime platform the replacing (606) of a static XML deployment descriptor (608) with a deployment descriptor (610) readable without an XML parser. One way of identifying (612) to a Java runtime platform, such as a Web container, the replacing (606) of a static XML deployment descriptor (608) with a deployment descriptor (610) readable without an XML parser includes setting a flag (614) in the Java application (310). In some embodiments, such a flag may be located in a properties file accessible to the Java application. In the case of a Web application, for example, such a flag may be located in a properties file of the Web application WAR file.

As discussed above, examples of target systems with resource constraints include target systems with limited runtime processing capabilities, target systems having no XML parser, target systems having limited persistent storage, and so on as will occur to those of skill in the art. For further explanation, FIG. 7 sets forth a flow chart illustrating an exemplary method for deploying Java applications on target systems having limited processing capacity (704).

Figure 7:
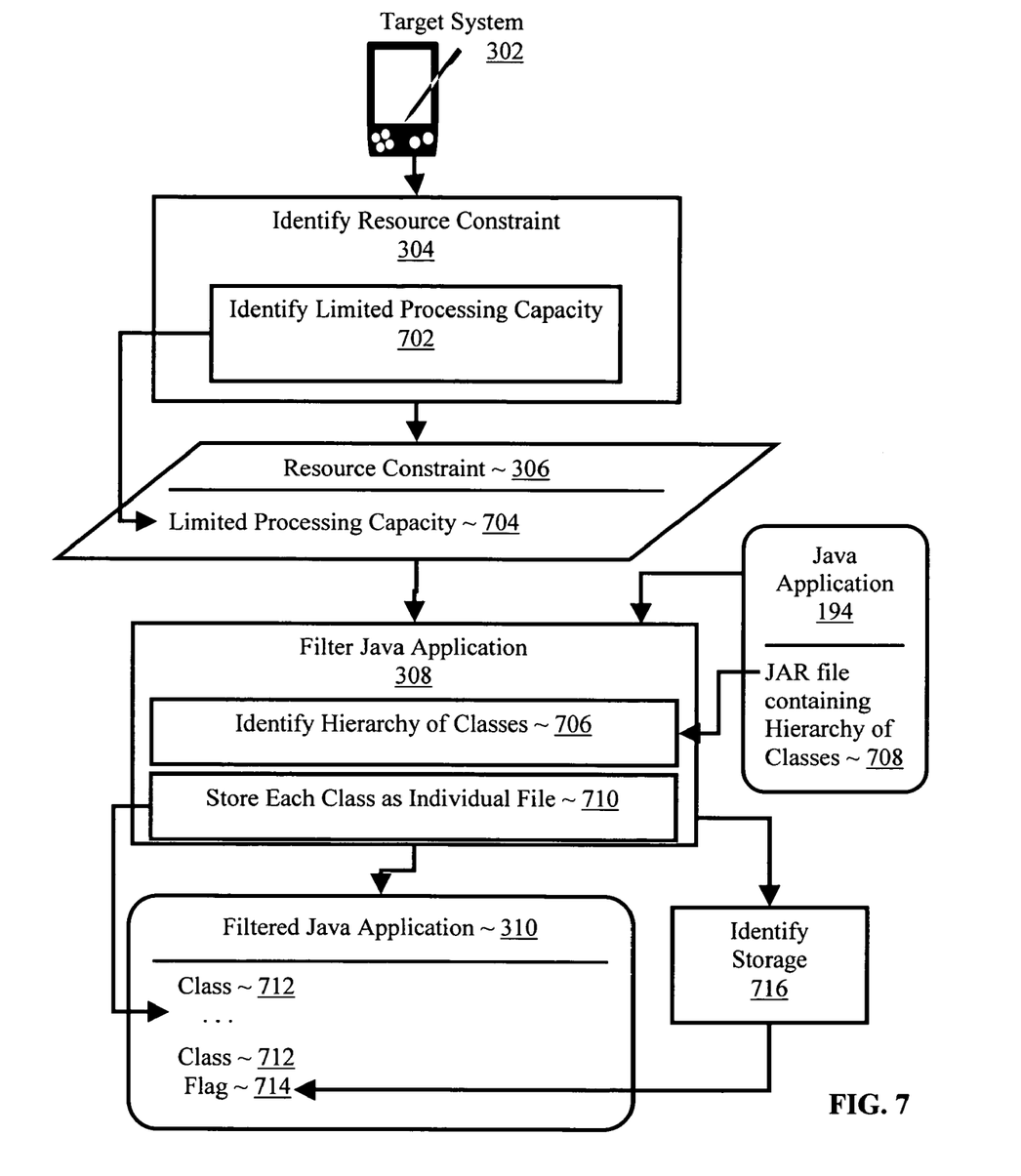
FIG. 7 sets forth a flow chart illustrating an exemplary method for deploying Java applications on target systems having limited processing capacity.

In the method of FIG. 7, identifying (304) a resource constraint (306) of a target system (302) is carried out by identifying (702) a target system (302) having limited processing capacity (704). Identifying (702) a target system (302) having limited processing capacity (704) is typically carried out by a Java application developer seeking to optimize a Java application for a particular target system or for target systems sharing a particular resource constraint.

In the method of FIG. 7, filtering (308) the Java application (194) in dependence upon the identified resource constraint (704) is carried out by identifying (706) a hierarchy of classes of the Java application stored in a single file (708) and storing (710) each class of the hierarchy as a separate file (712) accessible to the Java application (310). By storing each class as a separate file accessible to the Java application, accessing a class in executing the Java application no longer requires opening a particular file and searching for a particular class stored within the file. Storing each class as a separate file accessible to the Java application advantageously reduces the processing requirements of the target system.

Web applications, for example, often have a hierarchy of classes stored in a single compressed Java Archive ('JAR') file. Accessing the hierarchy of classes stored in a single compressed JAR file therefore also includes decompressing the JAR file containing the hierarchy of classes prior to accessing one or more of the classes contained within the file. This is an additional strain on target systems. The method of FIG. 6 advantageously also reduces the requirement of repeatedly decompressing compressed files. By decompressing the single file containing the hierarchy of classes only once and then storing each class as a separate file accessible to a Web application, the process of decompressing the file each time a class is accessed is reduced to a single decompression occurring before the Web application is installed on the target system. Such embodiments advantageously reduce the strain of the Web application on the processing requirements of the target system.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for deploying an application in a resource constrained environment, the application comprising a computer program written in the Java® computer programming language, the method comprising:

identifying a resource constraint of a target system including identifying a target system having limited processing capacity;

filtering the application in dependence upon the identified resource constraint including:

preprocessing a tag library of the application, including identifying a tag library descriptor of the application and copying a listener from the tag library descriptor to a deployment descriptor for the application;

identifying a hierarchy of classes of the application stored in a single file;

storing each class of the hierarchy as a separate file accessible to the application; and identifying to a runtime platform the copying of the listener from the tag library descriptor to the deployment descriptor, including setting a flag in the application.

2. The method of claim 1 wherein:

identifying a resource constraint of a target system further comprises identifying that the target system has no Extensible Markup Language (XML) parser; and filtering the application in dependence upon the identified resource constraint, including replacing a static XML deployment descriptor for the application with a deployment descriptor readable without an XML parser.

3. The method of claim 2 further comprising identifying to a runtime platform the replacing of a static XML deployment descriptor for the application with a deployment descriptor readable without an XML parser.

4. The method of claim 1 further comprising decompressing the single file containing the hierarchy of classes.

5. An apparatus for deploying an application in a resource constrained environment, the application comprising a computer program written in the Java® computer programming language, the apparatus comprising a computer processor, a computer memory operatively coupled to the computer processor, the computer memory having disposed within it computer program instructions capable of:

identifying a resource constraint of a target system including identifying a target system having limited processing capacity;

filtering the application in dependence upon the identified resource constraint including:

preprocessing a tag library of the application, including identifying a tag library descriptor of the application and copying a listener from the tag library descriptor to a deployment descriptor for the application;

identifying a hierarchy of classes of the application stored in a single file;

storing each class of the hierarchy as a separate file accessible to the application; and identifying to a runtime platform the copying of the listener from the tag library descriptor to the deployment descriptor, including setting a flag in the application.

6. The apparatus of claim 5 wherein:

identifying a resource constraint of a target system further comprises identifying that the target system has no Extensible Markup Language (XML) parser; and filtering the application in dependence upon the identified resource constraint, including replacing a static XML deployment descriptor for the application with a deployment descriptor readable without an XML parser.

7. The apparatus of claim 6 further comprising computer program instructions capable of identifying to a runtime platform the replacing of a static XML deployment descriptor for the application with a deployment descriptor readable without an XML parser.

8. The apparatus of claim 5 further comprising computer program instructions capable of decompressing the single file containing the hierarchy of classes.

9. A computer program product for deploying an application in a resource constrained environment, the application comprising a computer program written in the Java® computer programming language, the computer program product disposed on a computer-readable recording medium, the computer program product comprising computer program instructions capable of:
- identifying a resource constraint of a target system including identifying a target system having limited processing capacity;
- filtering the application in dependence upon the identified resource constraint including:
  - preprocessing a tag library of the application, including identifying a tag library descriptor of the application and copying a listener from the tag library descriptor to a deployment descriptor for the application;
  - identifying a hierarchy of classes of the application stored in a single file;
  - storing each class of the hierarchy as a separate file accessible to the application; and
- identifying to a runtime platform the copying of the listener from the tag library descriptor to the deployment descriptor, including setting a flag in the application.

10. The computer program product of claim 9 wherein:
- identifying a resource constraint of a target system further comprises identifying that the target system has no Extensible Markup Language (XML) parser; and
- filtering the application in dependence upon the identified resource constraint, including replacing a static XML deployment descriptor for the application with a deployment descriptor readable without an XML parser.

11. The computer program product of claim 10 further comprising computer program instructions capable of identifying to a runtime platform the replacing of a static XML deployment descriptor for the application with a deployment descriptor readable without an XML parser.

12. The computer program product of claim 9 further comprising computer program instructions capable of decompressing the single file containing the hierarchy of classes.

* * * * *